June 27, 1933.  O. M. LUND  1,915,939

CONVEYER CHAIN

Filed Jan. 7, 1932

Witness
H. O. McKnight.

Inventor.
Oscar M. Lund
by [signature]
his Attorneys.

Patented June 27, 1933

1,915,939

UNITED STATES PATENT OFFICE

OSCAR M. LUND, OF CHICAGO, ILLINOIS, ASSIGNOR TO SAMUEL OLSON & COMPANY, INC., OF CHICAGO, ILLINOIS, A CORPORATION OF ILLINOIS

CONVEYER CHAIN

Application filed January 7, 1932. Serial No. 585,328.

This invention relates to conveyer chain construction and it is especially concerned with that type of chain which is employed in drag conveyers and the like, and which is operated in guides which may include laterally curved sections requiring the chain to be flexible in its plane of travel. One object of the invention is to provide a cheap and simple construction in which the links may be manufactured as castings and will require little or no machining or other finishing. Another object is to provide a chain composed of elements all exactly alike, which may be assembled or connected together manually without the use of tools and without securing means other than those embodied integrally in the parts themselves. The invention consists of certain features of the chain link and of the combination of such links in the chain as herein shown and described, and as indicated by the claims.

The type of chain to which this invention is directed is that commonly employed in drag conveyers or assembly line conveyers, being usually associated with guideways which, at least, control the direction of travel of the load, and usually serve to confine the chain laterally in its movement. Particularly where the conveyer travels along a floor, or operates over a considerable distance in a factory or warehouse for conveying articles or carrier boxes of articles from one point to another, it is desirable to have it operate otherwise than in a straight line, serving as a substitute for a tram or industrial railway, and turning corners or swinging out of alignment to travel past fixed machines or other obstructions, as requirements may dictate. This involves making the chain with joints which permit lateral articulation as well as the usual pivotal action in a vertical plane which occurs when the chain traverses the driving sprocket or guide pulley.

Figure 3:
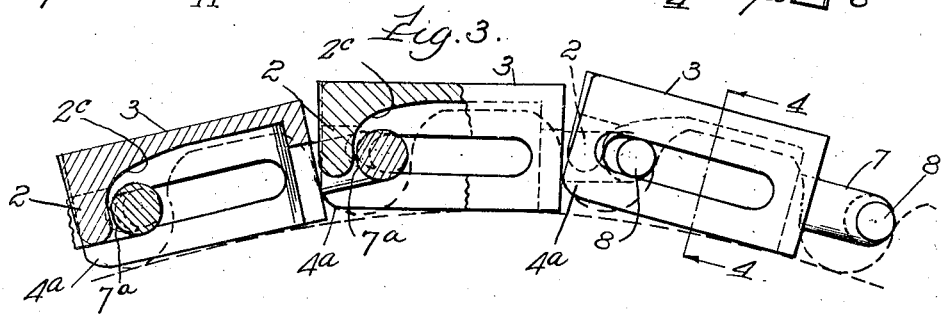
Figure 3 is a side elevation of several links of the chain disposed in the position they would assume in traversing a drive sprocket, and with certain parts shown in section.
Figures 4, 5, 6:
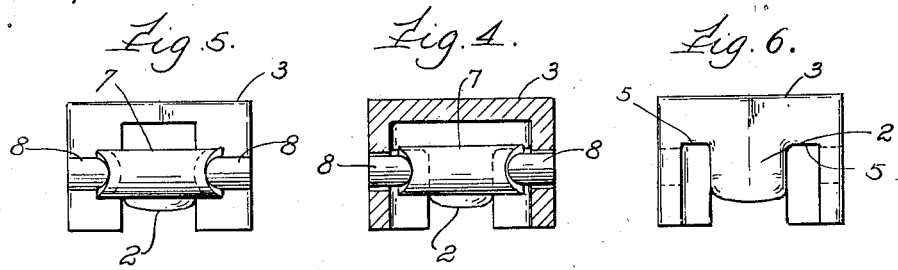
Figure 4 is a detail section taken as indicated at line 4—4 on Figure 3.
Figure 5 is an end elevation of the end of the link at which the pivot post is located.
Figure 6 is an end elevation showing the end of the link which includes the cross bar and connecting yoke portion.

To permit of this action each of the links, 1, is engaged with the next adjacent link by means of an integral pivot post, 2, of approximately semi-circular cross-section. The link itself is shown as of somewhat box-like formation including a web or wall, 3, with lateral flanges, 4, 4, and with end wall sections, 5, 5, which are lower than the flanges, 4, 4, and between which the post, 2, stands. At the opposite end the partial end flanges, 6, 6, are united by a yoke, 7, having a rounded inner contour at 7ª, which fits the curvature of the inner face, 2ª, of the post, 2, on the next adjacent link. Thus the engagement of the yoke, 7, of one link with the post, 2, of the next link, constitutes the pivotal connection which permits lateral swinging movement of any link with respect to the next link in the chain. The concave arch, 7ª, of the yoke, 7, is convexly curved in vertical section so as to facilitate rolling or pivotal action of this surface upon the face of the post, 2, when the chain traverses a vertically curved path, as in rounding a sprocket, as indicated in Figure 3.

Figure 2:
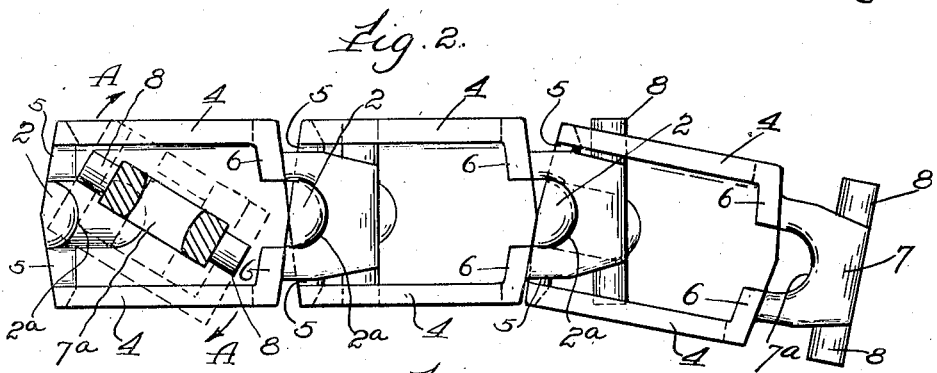
Figure 2 is a bottom plan view of three links of a chain embodying this invention, and includes a portion of a fourth link indicated in a position ready for assembly with its adjacent link.

At the outer end the yoke, 7, carries a cross bar integrally formed, and having end portions, 8, 8, which engage in the longitudinal slots, 9, of the side flanges, 4, when the links are assembled, and check said links vertically so as to maintain the yoke of each link in operative relation to the pivot post, 2, of the adjacent link. Figure 2 indicates how simply the chain is assembled by merely entering the ends, 8, 8, of the cross bar of one link obliquely between the side flanges 4, 4, of the next link, and then swinging the first link about its longitudinal axis in the direction of the arrows, A, A, until the cross bar stands directly across the second links with its ends, 8, 8, in the slots, 9. During this operation the first link stands with its longitudinal axis at right angles to that of the second link; and with the parts still in this relation the first link is slid lengthwise until its yoke, 7, strikes the post, 2. It is then swung down into alignment with the second link, and the operation is repeated for adding another link, and then another, until a chain of the desired length has been made up.

Figure 1:
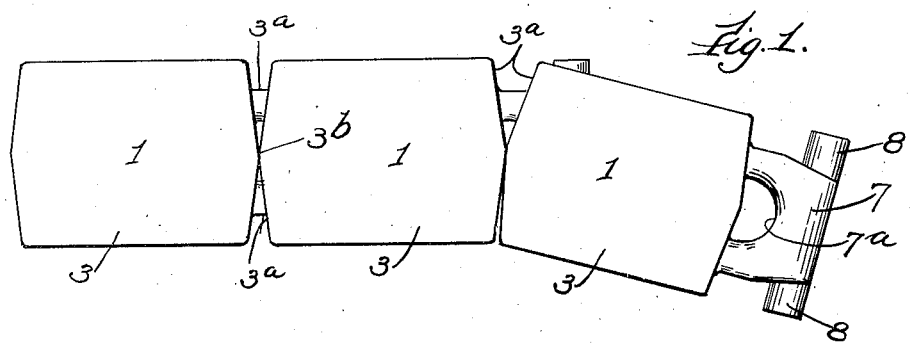
Figure 1 is a top plan view of three links of a chain embodying this invention showing the links coupled together and showing two of them disposed out of alignment as permitted by the special features of this design.

To permit lateral articulation of the links in traversing horizontally curved paths, the web, 3, of each link is formed with a convex outline at each end; as shown in Figure 1, this consists of two straight portions, $3^a$, which meet in an apex at $3^b$ at the middle of the width of the link, and this apex, $3^b$, is located substantially on the axis of the curved face of the post, 2, so that the points, $3^b$, of adjacent links remain substantially in contact during the limited rotation of one link upon the post of the other, which is permitted by the clearance angle formed between the slanted end outlines, $3^a$, of adjacent links. To permit the vertical articulation required of the links as they traverse a sprocket or guide pulley, as indicated in Figure 3, the lower portions of one end of each side flange, 4, is rounded off as shown at $4^a$. The slots, 9, are provided with extra length at $9^a$ to permit free swinging movement of the end portions, 8, of the cross bars when the links pivot about their connecting posts, 4, and, preferably, the extreme ends of the slots, 9, are beveled or chamfered at $9^b$ in accordance with the inclined position which the parts, 8, assume when the links are angularly disposed with respect to each other. Preferably, the web or top wall, 3, of each link is made flat so as to adapt it to serve as a support, if desired, for the material or containers to be propelled by the chain; this flat surface is also convenient for locating holes to be drilled and tapped at any convenient point in the area of the web, 3, if hooks, lugs or flights are to be attached to the chain links. As seen in Figure 3, the post member, 2, of each link is reinforced by an elongated fillet, $2^c$, by which its rounded vertical face is merged into the under surface of the web, 3. In addition to the end wall portions, 5, 5, which connect the flanges, 4, with the post, tend to carry some of the strain to the flanges when the chain is subjected to tension.

While there is shown and described herein certain specific structure embodying the invention, it will be manifest to those skilled in the art that various modifications and rearrangements of the parts may be made without departing from the spirit and the scope of the invention, and that the same is not limited to the particular form herein shown and described, except in so far as indicated by the appended claims.

I claim:

1. A chain link for the purpose indicated comprising a web with side flanges, said flanges being longitudinally slotted, and the link having an extension at one end formed with laterally projecting trunnion-like portions to engage the slots of the next adjacent link, said extension including a yoke with a curved inwardly-facing surface, and the opposite end of the link having an integrally formed pivot post disposed between the side flanges with clearance between said post and the flanges to accommodate portions of the yoke of a next adjacent link when interconnected with the first by engagement with said post.

2. A chain link for the purpose indicated comprising a web with side flanges, said flanges being longitudinally slotted, and the link having an extension at one end formed with laterally projecting trunion-like portions to engage the slots of the next adjacent link, said extension including a yoke with a curved inwardly facing surface, and the opposite end of the link having an integrally formed pivot post disposed between the side flanges, said trunnion-like portions being dimensioned for insertion diagonally between the opposite flanges of a similar link in assembling said links into a chain, whereby twisting the link from said diagonal position engages said trunnions in the slots of the other link and rocking the link about said trunnions swings the curved face of the yoke into position against the pivot post of said other link.

3. A chain link for the purpose indicated comprising parallel longitudinally extended side webs and opposite ends joining the side webs, said side webs having similar longitudinally extending slots, one end having an exteriorly extending yoke terminating in a cross head forming trunnions adapted to engage the slots of the next adjacent similarly formed link in the chain at that end, the opposite end comprising an integral pivot post projecting transversely with respect to the cross head of the first mentioned end between the planes of the side webs with clearance for accommodating the yoke of the next adjacent identical link of the chain at said opposite end.

4. The construction defined in claim 3, the link opening bounded by said side webs and cross-connecting ends, and the slots in said side webs being dimensioned relatively to said cross head and trunnion terminals thereof for insertion of the cross head diagonally in said opening of the next similar link and for entrance of the trunnions in the slots by turning the cross heads into transverse position.

OSCAR M. LUND.